United States Patent [19]  [11] 4,116,058
Herzl et al.  [45] * Sep. 26, 1978

[54] CONTOURED OBSTACLE ASSEMBLY FOR VORTEX-TYPE FLOWMETER

[75] Inventors: Peter J. Herzl, Morrisville; Warren Strohmeier, Warminster, both of Pa.

[73] Assignee: Fischer & Porter Co., Warminster, Pa.

[ * ] Notice: The portion of the term of this patent subsequent to Oct. 11, 1994, has been disclaimed.

[21] Appl. No.: 818,733

[22] Filed: Jul. 25, 1977

Related U.S. Application Data

[63] Continuation-in-part of Ser. No. 758,849, Jan. 12, 1977, Pat. No. 4,052,895.

[51] Int. Cl.² .............................................. G01F 1/32
[52] U.S. Cl. ............................................... 73/194 VS
[58] Field of Search ................................... 73/194 VS

[56] References Cited

U.S. PATENT DOCUMENTS

| 3,116,639 | 1/1964 | Bird | 73/194 |
|---|---|---|---|
| 3,732,731 | 5/1973 | Fussell, Jr. | 73/194 |
| 3,823,610 | 7/1974 | Fussell, Jr. | 73/194 |
| 3,927,564 | 12/1975 | Ketelsen | 73/194 |
| 3,948,097 | 4/1976 | Kurita et al. | 73/194 |

Primary Examiner—Herbert Goldstein
Attorney, Agent, or Firm—Michael Ebert

[57] ABSTRACT

A flowmeter of the vortex type in which an obstacle assembly mounted in a flow tube causes vortices to be shed at a frequency that is a function of flow rate. The assembly includes a block fixedly mounted across the flow tube at right angles to the direction of flow, the block having a substantially square cross-section to present a flat face to the incoming fluid. The width of the block has its maximum value at the mid-point thereof and diminishes gradually toward either end where the width assumes its minimum value such that the upper and lower faces of the block are bellied and the front face has a double-convex contour. The maximum width value affords an efficient shedding action, the mean width value of the block being significantly smaller than the maximum value to substantially reduce the pressure drop produced by the meter.

7 Claims, 4 Drawing Figures $A_1/D \simeq .20$ TO $.35$
$C \simeq A_1$
$B \simeq 2/3 C$
$B' \simeq 1/3 C$
$E \simeq 3/4$ TO $1 1/2 D$
$F \simeq 1/4$ WAVELENGTH
ANGLE OF $b_1$ AND $b_2$ TO FF IN RANGE OF 45° TO 60°

CONTOURED OBSTACLE ASSEMBLY FOR VORTEX-TYPE FLOWMETER

RELATED APPLICATION

This application is a continuation-in-part of our copending application, Ser. No. 758,849, filed Jan. 12, 1977, (now U.S. Pat. No. 4,052,895) entitled "Obstacle Assembly for Vortex-Type Flowmeter."

BACKGROUND OF INVENTION

This invention relates generally to flowmeters of the vortex-shedding type and more particularly to a contoured shedding body for meters of this type which functions to minimize the pressure drop in the meter without impairing the operating efficiency thereof.

Under certain circumstances, the presence of an obstacle in a flow conduit will give rise to periodic vortices. For small Reynolds numbers, the downstream wake is laminar in nature, but at increasing Reynolds numbers, regular vortex patterns are formed. These patterns are referred to as Karman vortex streets. The frequency at which vortices are shed in a Karman vortex street is a function of flow rate.

In this vortex-type flowmeter disclosed in Burgess U.S. Pat. No. 3,589,185, the obstacle assembly mounted in the flow conduit is constituted by a block positioned across the conduit with its longitudinal axis at right angles to the direction of fluid flow, a strip being supported behind a block and being spaced therefrom to define a gap which serves to trap Karman vortices and to strengthen and stabilize the vortex street. This vortex street is sensed to produce a signal whose frequency is proportional to flow rate.

In Herzl U.S. Pat. No. 3,867,839, the obstacle assembly disclosed therein also makes use of a block mounted across the flow conduit, but this block has a triangular cross-section with its apex being pointed toward the incoming fluid. Obstacle bodies having other cross-sectional shapes including a cylindrical form are disclosed in the Bird U.S. Pat. No. 3,116,639, and in the Rodley U.S. Pat. No. 3,572,117.

The advantage of a vortex-shedding body having a cylindrical form is that it is physically strong, mechanically stable and offers adequate internal space within which to mount various sensing systems. But these advantages are offset by the fact that a cylinder produces an irregular shedding action and does not have a very large operating range of constant meter coefficients, to say nothing of a number of other problems which militate against the use of a cylindrical shedding body.

It is known that flat plates afford the strongest shedding phenomenon. On the other hand, flat plates are physically weak and do not provide sufficient internal space for mounting sensing systems. For example, in the Herzl U.S. Pat. No. 3,946,608, the obstacle body has a trapezoidal cross-section, and it becomes possible with this shape to mechanically transmit the vibrations of a deflectable section cantilevered from the rear of this body to an external coupling point by means of a rod passing through an internal duct in the body. This is difficult to do with a flat plate.

The problems encountered with obstacle assemblies of the type heretofore known are aggravated in flowmeters of relatively small size. Thus only one manufacturing company has been able to produce a vortex-type flowmeter with a flow tube diameter of less than 2 inches, the meter including a flat plate obstacle. But the limitations imposed on the sensing system by this obstacle shape and the concomitant hydraulic problems are such that these meters have been marginal in operation.

In our copending application Ser. No. 758,489, above-identified, there is disclosed an obstacle assembly for a small diameter vortex-shedding flowmeter that is both mechanically and hydraulically efficient and whose internal volume is more than adequate to accommodate a sensing system whereby the meter is capable of shedding effectively at low Reynolds numbers and affords a meter linearity of better than ± 1%.

The assembly disclosed in our copending application includes a block positioned across the tube at right angles to the direction of fluid flow and a sensing vane cantilevered behind the block by means of a resilient beam, such that vortices shed by the block produce fluidic oscillations which cause the vane to vibrate at a frequency proportional to flow rate. The flat front face of the block is presented to the incoming fluid, the rear corners of the block being bevelled to define a flat rear face of reduced area. The resultant block configuration acts to enhance the shedding characteristics of the obstacle assembly and to produce substantially linear flow rate measurements at low Reynolds numbers.

In a flowmeter of the type disclosed in our copending application, the shedding characteristics are mainly determined by the width of the block; the wider the shedder, the lower the shedding frequency for a given flow rate. It has long been recognized that for satisfactory flowmeter performance, the ratio of the width of the shedding obstacle to the internal diameter of the flow tube must not be too small. But this relationship is not highly critical, and, as indicated in our copending application, an acceptable width may lie in the range of about 0.15 to 0.35 of the internal tube diameter. In practice, however, the low end of this range is usually about 0.20.

A vortex-shedding flowmeter interposed in a fluid line introduces a pressure drop therein which is approximately equal to the square of the width of the shedding body; hence the wider the obstacle, the greater the drop. As a consequence, an obstacle having a width large enough to afford good shedding characteristics usually gives rise to a substantial pressure drop. A large pressure drop has certain practical drawbacks; for to make up the pressure drop, pumping power is required, and this contributes to the installation and operating costs of the system. Moreover, the flowmeter will cavitate at high flow if the system pressure is low.

Yet with obstacle configurations of the type heretofore known, including the configuration disclosed in our copending application, though one can decrease the pressure drop of the meter merely by reducing the width of the obstacle, this reduction is at the expense of its shedding characteristics. Hence it has not heretofore been possible to effect a substantial reduction in pressure drop without adverse effects on meter performance.

SUMMARY OF INVENTION

In view of the foregoing, the main object of this invention is to provide an obstacle assembly for a vortex shedding flowmeter that is both mechanically and hydraulically efficient and yet introduces a relatively low pressure drop.

More particularly, it is an object of this invention to provide an obstacle assembly whose configuration is such that the meter is capable of shedding effectively at low Reynolds numbers and affords a meter linearity of better than ± 1%. A significant feature of the invention is that all of the advantages of the obstacle assembly of the type disclosed in our copending application are retained, even though the pressure drop introduced thereby is substantially lower than that produced by our prior assembly.

Thus with an obstacle assembly in accordance with the invention, the pressure drop is held to a minimum, thereby obviating the need for pumping power to make up the drop and avoiding the danger of cavitation.

Briefly stated, these objects are attained in a vortex-type flowmeter provided with an obstacle assembly mounted in a flow tube having a given internal diameter. The assembly includes a block having a generally rectangular cross-section positioned across the tube at right angles to the direction of fluid flow, the incoming fluid impinging on the flat front face of the block. Cantilevered behind the block by means of a resilient beam is a sensing vane, such that vortices shed by the block produce fluidic oscillations causing the vane to vibrate at a frequency proportional to flow rate. These vibrations are transmitted by an internal linkage to an external sensor.

The width of the block has its maximum value at the mid-point thereof and diminishes progressively toward either end where the width assumes its minimum value, whereby the flap upper and lower faces of the block have a bellied formation and the front face has a double-convex contour, the resultant block geometry generally compatible with the typical flow velocity profile.

The maximum width of the block is preferably about 0.20 to 0.35 of the internal diameter of the flow tube, which relationship provides an effective shedding action. The value of the maximum width of the block is preferably greater than the minimum width by about 0.105 to 2; hence the mean width is significantly smaller than the maximum width. Because the pressure drop introduced by the meter is a function of the square of the mean width, this drop is substantially lower than that of a meter having an obstacle of uniform width whose value corresponds to the maximum width.

OUTLINE OF DRAWINGS

For a better understanding of the invention as well as other objects and further features thereof, reference is made to the following detailed description to be read in conjunction with the accompanying drawings, wherein.

Figure 1:
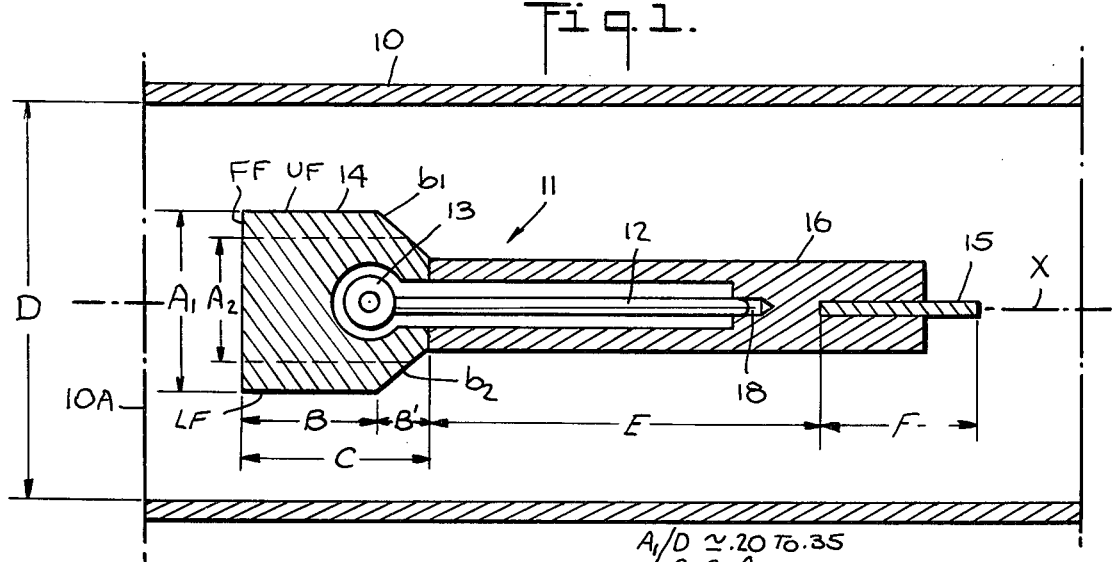
FIG. 1 is a longitudinal section taken through a vortex flowmeter including an obstacle assembly in accordance with the invention.
Figure 2:
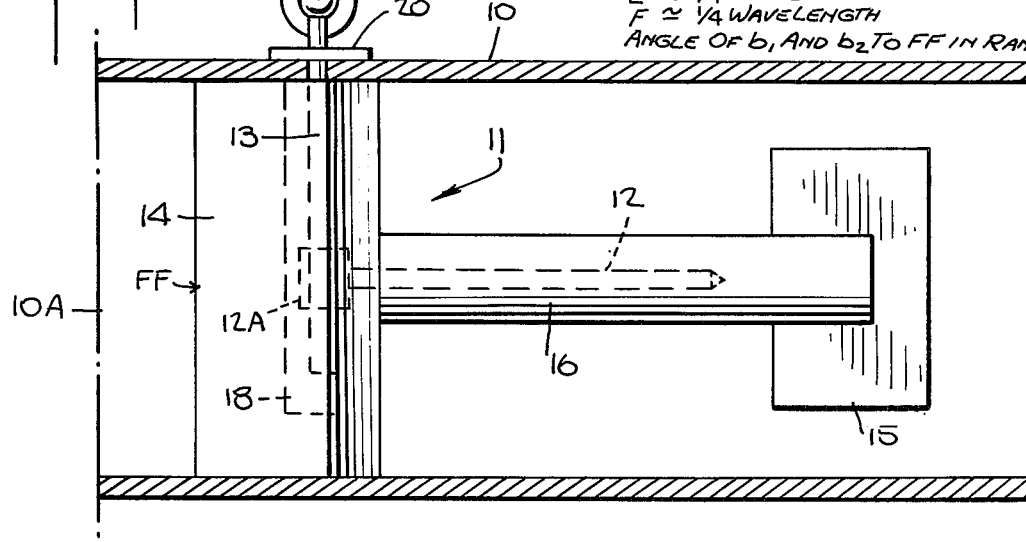
FIG. 2 is a section taken through the meter in the plane indicated by line 2—2 of FIG. 1.
Figure 3:
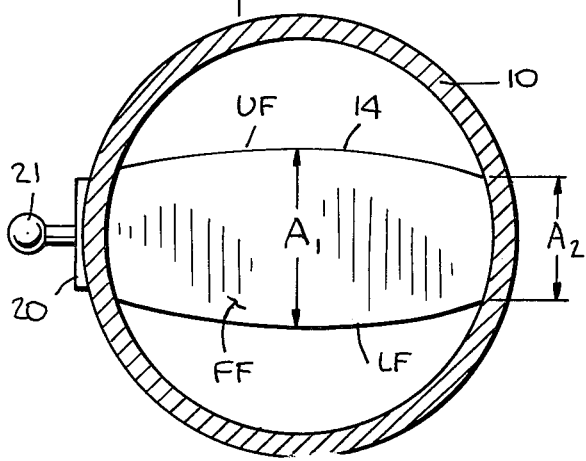
FIG. 3 is a front view of the meter.
Figure 4:
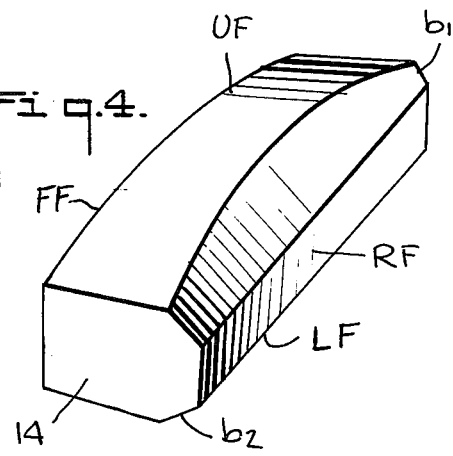

FIG. 4 separately illustrates, in perspective, the block included in the obstacle assembly.

DESCRIPTION OF INVENTION

In a vortex-type flowmeter disclosed in the Herzl U.S. Pat. No. 3,867,839, the obstacle assembly is adapted to generate strong stabilized fluidic oscillations causing a deflectable section of the assembly to vibrate at a corresponding rate. These mechanical vibrations are sensed by one or more strain gauges mounted within the deflectable section to produce a signal whose frequency is proportional to the flow rate of the fluid.

In the flowmeter in accordance with the invention illustrated in FIGS. 1 to 4, the vibrations of a deflectable section of the obstacle assembly are detected by a force sensor which is external to the flow tube. It is to be understood, however, that while the invention is illustrated in an external sensor arrangement in order to show how the obstacle assembly provides adequate space for a sensing system, in its broadest aspect, the invention, which is primarily concerned with the geometry of the obstacle assembly to reduce the pressure drop, is applicable to internal as well as external sensor arrangements for vortex-type flowmeters and to vortex meters with other sensing expedients, such as thermistors, pressure sensors, etc.

The meter shown in FIGS. 1 to 4 includes a flow tube 10 interposed in the water line for a waterflood system or in any other environment in which it is necessary to conduct an occasional test of flow rate to determine whether proper flow conditions exist. For this purpose, the flow tube may be provided with end flanges to facilitate coupling to the line. Mounted within flow tube 10 is an obstacle assembly generally designated by numeral 11, the assembly including a deflectable section which is responsible to the Karman vortex street and is caused to vibrate at a frequency which is proportional to flow rate. Incorporated in the obstacle assembly is a vibration transmitter composed of a rod 12 and a probe 13.

Flow tube 10, which is shown as having a circular cross-section, includes an inlet 10A into which the fluid to be metered is introduced. The flow impinges on obstacle assembly 11 which acts to divide the flow around the obstacle, producing fluidic perturbations in the form of a Karman vortex street. Obstacle assembly 11 is constituted by a transversely mounted front section 14 in the form of a block and a rear section 15 mounted behind the front section by a cantilever support in the form of a flexible beam 16.

Front section block 14 has a generally square cross-section whose axis is perpendicular to the flow axis of the flow tube to present a flat face FF to the incoming fluid. The ends of front section block 14 are secured to the wall of the tube whereby this block is held fixedly within the tube. The width of the block has its maximum value at the midpoint thereof and diminishes progressively toward the ends where it assumes its minimum value such that the upper and lower faces UF and LF are bellied and the front face FF has a double-convex contour, the resultant block geometry being generally compatible with the bellied or bullet-like form of the typical flow profile in which the flow velocity of the incoming fluid in the flow tube is greatest at the tube center and diminishes progressively toward the wall of the tube.

Rear section 15 is constituted by a rectangular vane which is maintained by beam 16 in spaced relation to the front section, the plane of the vane being perpendicular to the front face of front section block 14. The rear section shape is such as to interfere with the vortex street, and the gap established between the front section block and the rear section vane tends to trap the vortices and to strengthen and stabilize the vortex street produced thereby.

Because rear section 15 is cantilevered by means of flexible beam 16, it is deflectable. The beam, though bendable, has sufficient rigidity as to permit only a slight deflection of the rear section. As a consequence of the fluidic oscillations produced within the flow tube, the deflectable rear section 15 is excited into vibration at a rate corresponding to the frequency of the oscillations.

The natural resonance of the deflectable rear section is such as to be well outside the normal frequency range of the meter whereby mechanical resonance peaks are absent and the amplitude of the vibrating motion accurately reflects the amplitude of the fluidic oscillations. The downstream vane section of the assembly carries out two functions, for this section which interferes with the wake not only stabilizes it to enhance its detectability, but its vibratory motion gives rise to the output signal.

Since the deflectable system is relatively rigid, the total excursion of the rear section is minute even at the highest amplitudes of fluidic oscillation; hence metal fatigue of the supporting beam as a result of the vibrating action is minimized and failures do not arise even after prolonged operation.

The magnitude of deflection is not of primary importance, for the flow rate information is given by the frequency, not the amplitude of vibration. Though the deflection magnitude is made extremly small in order to provide an acceptable fatigue life, this does not militate against a readable output of varying frequency.

The minute vibrations of the deflectable rear section of the obstacle assembly are sensed outside of flow tube 10 rather than within the tube. For this purpose, the vibrations are conveyed by the vibration transmitter, including rod 12, whose rear portion is socketed within a bore 18 within beam 16, the bore extending to a point adjacent deflectable section 15. The front portion of rod 12 lies freely within a relatively large diameter, longitudinally extending bore 19 communicating with the smaller diameter bore 18 and extending well into front section 14.

Rod 12 terminates in a collar 12A which encircles the end portion of probe 13 to provide a link between the rod and the probe. Probe 13 extends through a longitudinal passage in front section 14 and projects through an opening in the wall of flow tube 10 which is covered by a flexible diaphragm 20, probe 13 terminating in a coupling head 21. Any force sensor 22 capable of responding to a force developed at coupling head 21 to produce a corresponding electrical signal may be used to provide a signal indicative of flow rate.

As noted previously, an obstacle body having a simple square or rectangular cross-section is a mechanically efficient shape and provides sufficient internal volume to accommodate the rod and probe for transmitting the vibrations to an external sensing point. But a simple square cross-section shape affords a relatively poor shedding action. It has been found, however, that when the block is modified in the manner shown, the shedding characteristics are significantly altered and the body becomes a superb shedder without, however, introducing a large pressure drop. This shedder is particularly advantageous in small vortex-type flowmeters (1 to 8 inch internal diameter).

The modification will now be explained. The front section block having a square cross-section has a maximum width $A_1$ at its midpoint, and a minimum width $A_2$ at its ends. The ratio of maximum width $A_1$ to minimum width of the range of about 1.05 to 2, so that the mean width $A_3$ of the block has a value which is significantly lower than the maximum width.

Front face FF is presented to the incoming fluid stream, and rear face RF is parallel thereto, the two faces being at right angles to the direction of flow. The distance between front face FF and rear face RF is represented by symbol C, and this distance is about equal to width $A_1$. The rear corners of block 14 are bevelled, the upper and lower bevels $b_1$ and $b_2$ lying within a rear zone B' which is about one-third the distance C, so that the front zone B which encompasses the upper and lower flat face is two-thirds distance C.

The angle of bevels $b_1$ and $b_2$ may be in the range of about 45° to 60°. As a consequence, the area of rear face RF is small compared to the area of front face FF. The value of maximum width $A_1$ of the block relative to the internal diameter D of the flow tube is not critical and preferably lies in the range of about 0.20 to 0.35. The distance E along beam 16 between rear face RF of the block and the leading edge of vane 15 is about 1 to 1½ D, whereas the length F of vane 15 is about one-fourth wavelength. Wavelength is defined as flow velocity divided by the frequency of shedding.

It has been found that with a shedding arrangement having the geometric relationships set forth hereinabove, metal linearities of better than ± 1% can be achieved at Reynolds numbers as low as 7000. Because the $A_1$ to D relationship is not critical, this allows a fair degree of freedom in meter optimization.

The value of maximum width $A_1$ relative to minimum value $A_2$ is such as to create a contoured block geometry which is generally compatible with the typical bellied flow velocity profile, whereby the shedding characteristics of the block are at least as good as those of a block of the type shown in our copending application, whose width has a uniform value A throughout the longitudinal axis of the block, which value A corresponds to the maximum value $A_1$. The advantage of the present block configuration is that the mean width of the block is substantially lower than maximum value $A_1$. Because pressure drop is a function of the square of the mean value, this results in a minimal pressure drop much below that introduced by an obstacle assembly having a block whose uniform width is equal to value A.

While there has been shown and described a preferred embodiment of a contoured obstacle assembly for vortex-type flowmeter in accordance with the invention, it will be appreciated that many changes and modifications may be made therein without, however, departing from the essential spirit thereof. Thus the invention is not limited to an obstacle assembly of the configuration illustrated herein and is applicable to any assembly that includes a shedding block mounted across the tube, the block geometry being modified so as to provide a width having a maximum value at its midpoint, the width diminishing toward the ends where it assumes a minimum value, whereby the mean value is significantly smaller than the maximum value.

We claim:

1. A vortex-type flowmeter in which the fluid to be metered is conducted through a flow tube having a given internal diameter and an obstacle assembly therein to cause vortex shedding at a frequency which is a function of flow rate, said assembly comprising a block fixedly mounted across the tube at right angles to the direction of flow, said block having a width as measured between the upper and lower faces of the block which assumes a maximum value at its midpoint and diminishes gradually toward the ends where the width assumes a minimum value whereby the mean width of the block has a value which is significantly smaller than the maximum value, thereby minimizing the pressure drop introduced by the flowmeter, said block having a substantially rectangular cross-section to present a flat front face to the incoming fluid, the upper and lower faces being bellied and the front face having a double-convex contour to produce a block contour which is compatible with a typical flow velocity profile, the upper and lower rear corners of the block being bevelled to define a flat rear face of reduced width to enhance the shedding characteristics of the assembly.

2. A flowmeter as set forth in claim 1, wherein said maximum value is 1.05 to 2 greater than said minimum value.

3. A flowmeter as set forth in claim 1, wherein said maximum value is about 0.20 to 0.35 of the internal diameter of the tube.

4. A flowmeter as set forth in claim 1, wherein said bevelled rear corners occupy a rear zone which lies in a zone about one-third the distance between the rear and front faces of the block.

5. A flowmeter as set forth in claim 4, wherein said bevel has an angle in the range of about 45° to 60°.

6. A flowmeter as set forth in claim 1, wherein said assembly further includes a rectangular vane mounted at the end of a flexible beam cantilevered from the block whereby said vane is caused by said vortex shedding to vibrate at said frequency, said vane lying in a plane at right angles to said front face.

7. A flowmeter as set forth in claim 6, wherein the vibrations of said vane are mechanically transmitted to the outside of the tube by a rod passing through said beam and linked to a probe passing through said block and terminating in an external head which is engageable by a force sensor.

* * * * *